(No Model.) 3 Sheets—Sheet 1.
R. A. CONVERSE.
LOADING AND UNLOADING DEVICE.
No. 463,889. Patented Nov. 24, 1891.
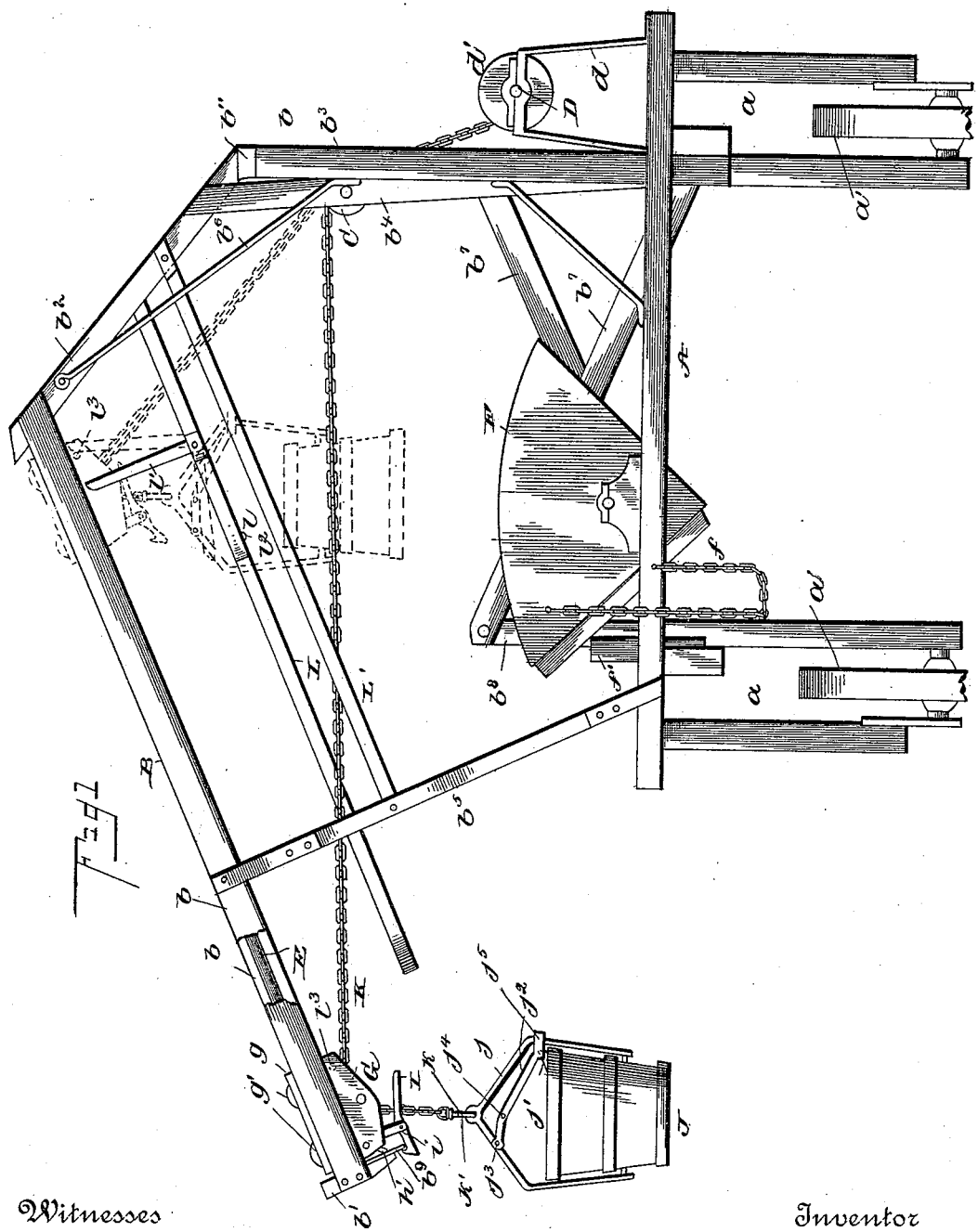
Witnesses
John Imrie
Thos. S. Hodges
Inventor
Rufus A. Converse
By his Attorney
Chadw McGill

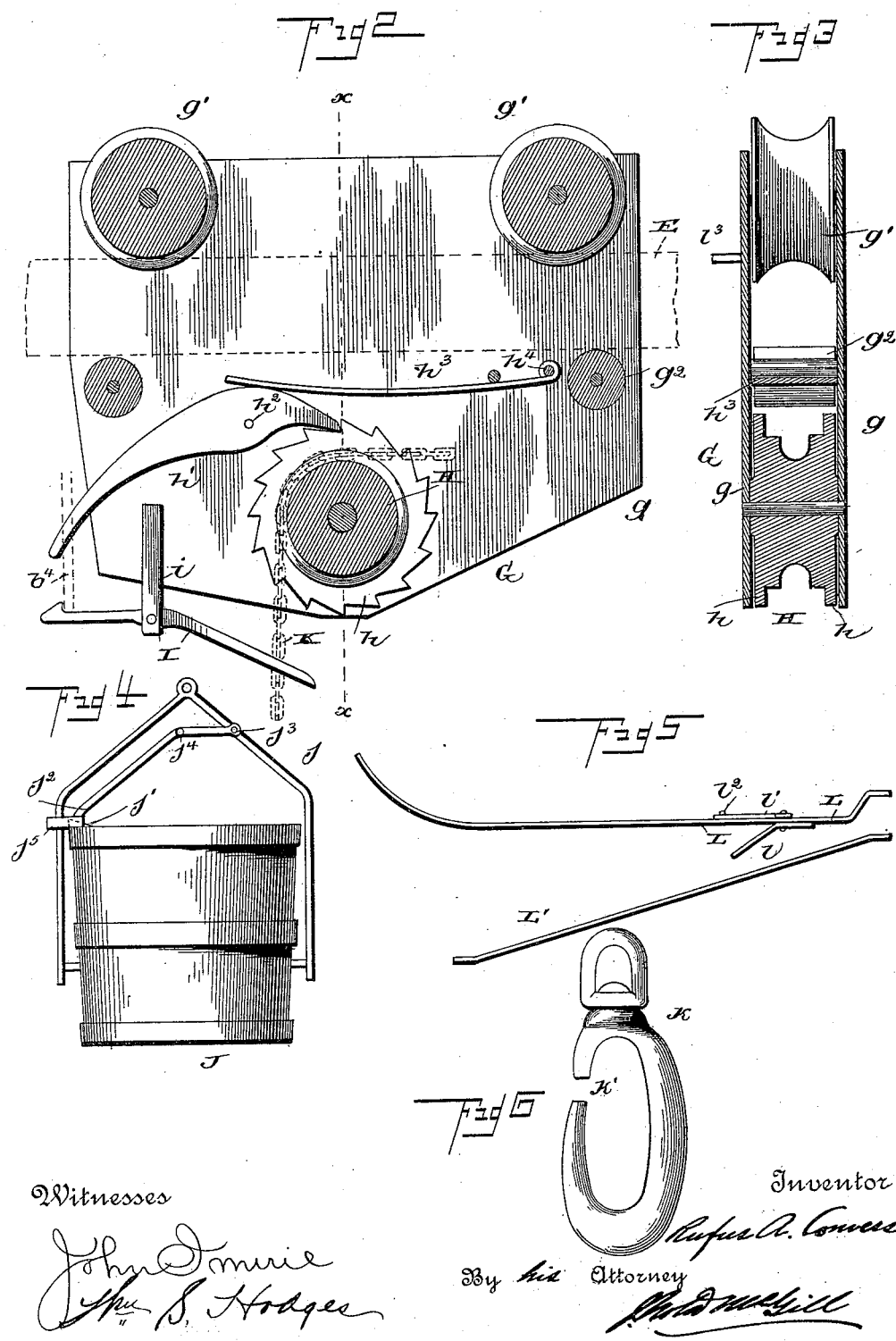

(No Model.) 3 Sheets—Sheet 3.
R. A. CONVERSE.
LOADING AND UNLOADING DEVICE.
No. 463,889. Patented Nov. 24, 1891.
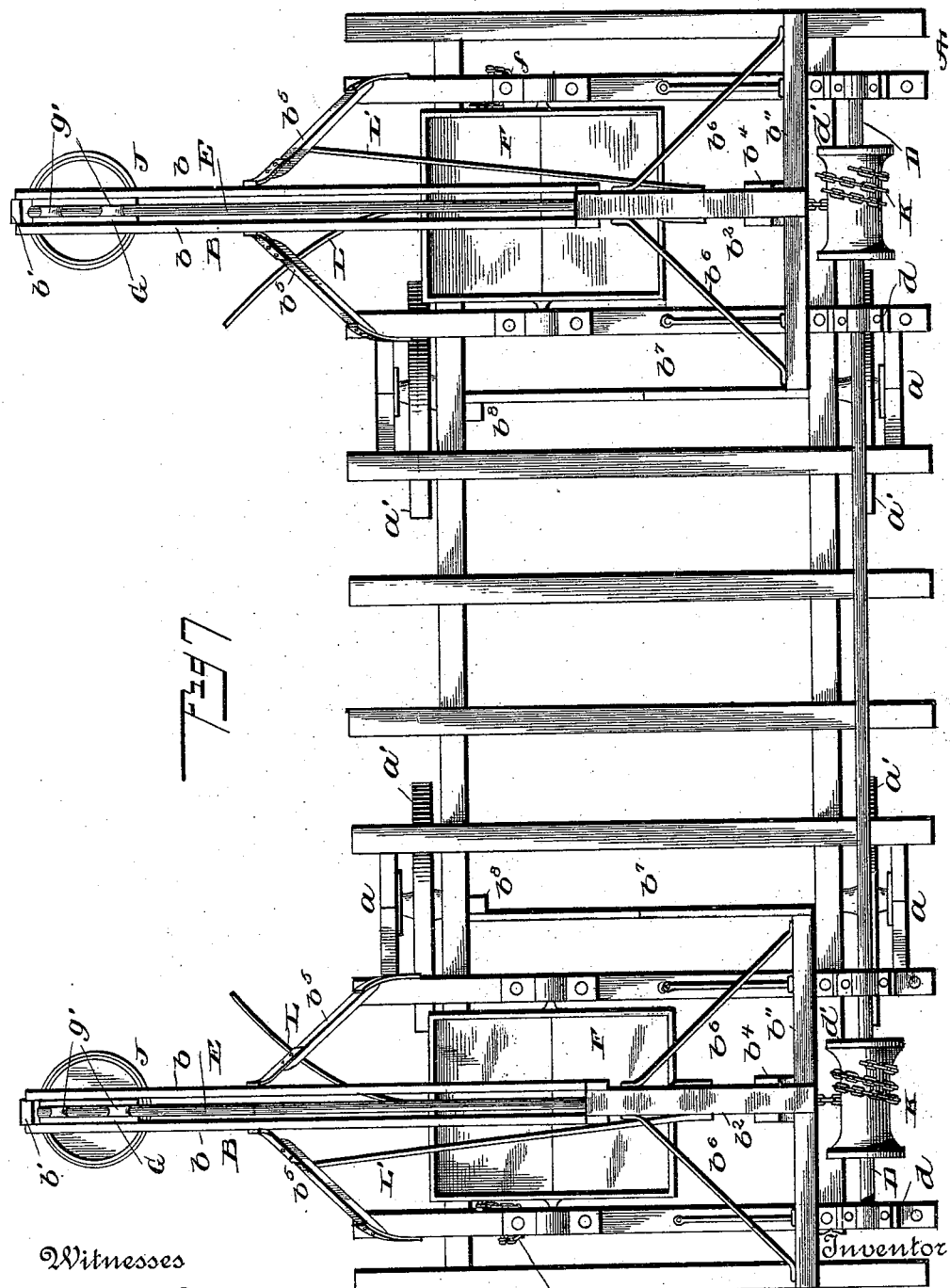
Witnesses
John Imirie
Wm. S. Hodges.
Inventor
Rufus A. Converse.
By his Attorney

UNITED STATES PATENT OFFICE.

RUFUS A. CONVERSE, OF MINNEAPOLIS, MINNESOTA.

LOADING AND UNLOADING DEVICE.

SPECIFICATION forming part of Letters Patent No. 463,889, dated November 24, 1891.

Application filed May 1, 1891. Serial No. 391,182. (No model.)

*To all whom it may concern:*

Be it known that I, RUFUS A. CONVERSE, a citizen of the United States of America, residing at Minneapolis, in the county of Hennepin and State of Minnesota, have invented certain new and useful Improvements in Loading and Unloading Devices, of which the following is a specification, reference being had therein to the accompanying drawings.

This invention relates to an improved loading and unloading device, being applicable more especially for excavating purposes, where the materials to be conveyed are first elevated and then emptied into receptacles, beneath which carts or other vehicles are located.

The invention has for its object, first, to provide a loading and unloading device capable of operation on a hillside as well as on level ground; second, to provide a single track for the rope-carriage; third, to provide improved means for automatically dumping the hoisting-buckets when the latter reach the full extent of their movement, and, fourth, to provide an improved carriage which will be securely held in place when not in use and automatically locked and unlocked.

The invention comprises a frame having a single track consisting of a circular rod located between inclined parallel bars and a trolley or carriage moving on said track and having a sheave-wheel and grooved wheels fitting said rod, said sheave-wheel being held locked when the trolley or carriage is traveling by a pawl in engagement therewith, said pawl being automatically disengaged when the trolley or carriage reaches the lower limit of its movement, a chain being passed over said sheave-wheel and having a bucket secured to one end, its other end being connected to an operating-shaft.

The invention further comprises a frame having a single track, a trolley or carriage moving thereon, an inclined dump-bar, a trip-lever, and a hoisting-bucket having a holding-arm pivoted at one end and designed to be raised out of engagement with said bucket at its other end by said trip-lever, which latter is operated by said trolley or carriage coming in contact therewith.

The invention further comprises the detail construction, combination, and arrangement of parts, substantially as hereinafter fully set forth, and particularly pointed out in the claims.

In the accompanying drawings, Figure 1 is an end view showing parts in dotted lines. Fig. 2 is an enlarged vertical sectional view of the trolley or carriage. Fig. 3 is a vertical sectional view on the line $x$ $x$, Fig. 2. Fig. 4 is a slightly-enlarged view of the dumping-bucket. Fig. 5 is a detail view showing the bucket-guide and dump-bars and their adjuncts. Fig. 6 is a detail view showing the swivel-hook enlarged. Fig. 7 is a plan view of the entire machine.

Referring to the drawings, A designates a wagon or platform having at each side adjacent to each end inner and outer hangers $a$, carrying at their lower ends the short axles of the wheels $a'$, by means of which the device can be moved to any desired point.

B B designate two inclined overhanging frames, one located at each end of the wagon or platform. These frames are composed each of two inclined parallel bars $b$, connected at their outer ends by an intermediate block $b'$, and at their upper ends said bars are secured to an inclined bar $b^2$, supported by two parallel vertical bars $b^3$, attached at their lower ends to platform A, and also additionally supported by two parallel bars $b^4$, likewise secured to said platform. To bars $b$ are secured the upper ends of brace-bars $b^5$, connected at their lower ends to the platform, and to the inclined bar $b^2$ are attached brace-rods $b^6$, secured also to the vertical bars $b^3$. The parallel bars $b^4$ are braced in position by cross-bars $b^7$, secured to a vertical bar $b^8$ of platform A. To the block $b'$ is secured a bumper-plate $b^9$, having its lower end extended beneath said block. Between the parallel bars $b^4$ is located a grooved wheel or pulley C.

The main operating-shaft D is located at one side of the wagon and is journaled in boxes secured on the upper ends of supporting-brackets $d$, and on said shaft near each end is a windlass $d'$. The shaft D is preferably operated by an engine or any suitable motor (not shown) located on platform A between the end frames B.

E E are tracks, which consist each of a single rod rigidly secured at its ends in each of the overhanging frames B and located between the inclined bars thereof.

At each end of the wagon or platform A is pivotally mounted a hopper F, which, when turned on its pivotal bearings, is designed to empty its contents into a cart or other vehicle located therebeneath. A chain $f$ limits the movement of the hopper when inverted and said hopper is held in its normal position by an arm $f'$ of platform A.

G designates the trolleys or carriages, one of which is designed to move on the track E of each frame B. This trolley or carriage consists of two corresponding side plates $g$, between which are journaled upper grooved wheels $g'$ for moving on the upper surface of track E and two smaller grooved wheels $g^2$ for bearing against the under side of said track. Between these side plates is journaled a sheave-wheel H, having a circumferential groove and two corresponding toothed flanges $h$, with which is designed to engage a pawl $h'$, fulcrumed at $h^2$ and normally held in contact with said tooth by a flat spring $h^3$, bearing thereon, said spring being held rigid at $h^4$. The pawl $h'$ is bent or curved so as to project beyond the outer ends of plates $g$, and the same is designed to come in contact with stop or bumper-plate $b^9$ and thus be disengaged from wheel H.

Between depending plates $i$ of carriage G is pivotally mounted a latch or holding-lever I, which is designed to engage the lower end of bumper-plate $b^9$ and hold the carriage firmly in position when at the lower end of the track.

J J designate the hoisting-buckets, each of which is provided with a bail $j$, pivotally connected thereto at a point below the horizontal center thereof. The upper edge of this bucket has a lug or curved flange $j'$, with which is designed to engage one end of a holding-arm $j^2$, pivotally secured at $j^3$ to bail $j$. This arm is provided with a lug or pin $j^4$ at its horizontal portion, and to the outer end of the inclined portion of said arm a loop or collar $j^5$ is secured, the said loop or collar encircling one side of the bail $j$, and is designed to normally be in engagement with the lug or flange $j'$, and thus hold the bucket in its proper position.

K K designate two chains, which at their inner ends are secured to the windlasses $d'$, and after being passed over pulleys C and the sheave-wheels H are connected to the bails of the buckets J by swivel-hooks $k$. These hooks have each upper and lower hooked ends and a recess or opening $k'$ between said ends for the insertion therethrough of the bail of the bucket. By means of this construction the bail will not become detached from the hook, the latter being so curved at its upper and lower ends as to make it impossible for the disconnection, save when the bail is removed by an operator.

To the inclined bar $b^2$ and brace-bars $b^5$ of each frame B are secured a guide-bar L and a dump-bar L', the latter being lower than guide-bar L and slightly diverged therefrom, so as to bear against the lower portion of the bucket in the passage of the latter and cause the same to readily dump or turn on its pivotal points when the holding-arm is released. To guide-bar L is secured an arm $l$, which limits the inward movement of the bucket at a point directly above the hopper.

An L-shaped lever $l'$ is fulcrumed upon guide L, and its lower outer end is limited in its movement by a stop $l^2$ on said guide-bar. The upper end of this lever projects up alongside the inclined bars $b$ of the overhanging frame in the line of the path of a projecting pin $l^3$ of the trolley or carriage G. The object of this lever is that as the hoisting-bucket approaches the inner limit of its movement the stud or pin $l^3$ will strike against its upper end and raising its lower end will cause the same to engage the lug or pin $j^4$, and thus raise the holding-arm $j^2$ out of engagement with the lug or flange $j'$ of bucket J, and permit the same to turn on its pivot and empty its load into the hopper.

From the foregoing description it will be seen that when the buckets are lowered (two being preferably employed, although provision may be made for employing a greater number thereof) so as to be filled, the trolleys or carriages are held locked at the lower ends of their tracks by the latch-levers I, and they remain in this position during the vertical movement of the buckets, said buckets being elevated simultaneously or alternately by the chains secured thereto and passed over sheave-wheels H. When the swivel-hooks come in contact with the latch-levers I, the latter will be disengaged and the trolleys or carriages will be free to move along their tracks. Immediately upon releasing the latch-levers the spring-pressed pawls $h'$ at once engage the toothed portions of the sheave-wheels and the trolleys or carriages move along their tracks until the buckets are arrested directly over their respective hoppers, at which time their holding-arms are held raised and their contents are at once dumped into said hoppers. In the return movement of the trolleys or carriages the sheave-wheels are prevented from turning by the pawls $h'$ until said trolleys or carriages reach the limit of their movement, when said pawls are disengaged and the sheave-wheels are permitted to turn and thus effect the lowering of the chains and their buckets.

The advantages of my invention are apparent to those skilled in the art to which it appertains, and it will be especially observed that the same is free from all complication, is highly efficient in operation, and is not liable to readily get out of order or be deranged. By employing single rods as tracks for the trolleys or carriages and providing the latter with upper and lower grooved wheels fitting snugly against said rods tilting or unevenness of movement of the trolleys or carriages is prevented.

I claim as my invention—

1. The herein-described loading and unloading device, comprising the wagon or platform, the inclined overhanging frame having parallel inclined bars, the single rod secured between said inclined bars and forming a track, the trolley or carriage moving on said rod and having a sheave-wheel and grooved wheels fitting said rod, means for locking said sheave-wheel when said trolley or carriage is traveling on its track, the hoisting-bucket and the chain connected thereto and passed over said sheave-wheel in said trolley or carriage, and means for operating said chain, substantially as set forth.

2. The herein-described loading and unloading device, comprising the wagon or platform, the inclined overhanging frame having parallel inclined bars, the single rod secured between said inclined bars and forming a track, the trolley or carriage having upper and lower wheels fitting said rod, the sheave-wheel secured therein, the pawl pivoted in said trolley or carriage and engaging said sheave-wheel at one end and projecting at its other end beyond said trolley or carriage, the stop or bumper-plate at the lower end of said overhanging frame for disengaging said pawl, the chain passed over said sheave-wheel, the hoisting-bucket secured to the outer end of said chain, and the operating-shaft to which the inner end of said chain is connected, substantially as set forth.

3. The herein-described loading and unloading device, having inclined overhanging frame, the single rod secured therein forming a track, the stop or bumper-plate projecting from the outer lower end of said frame, the trolley or carriage having upper and lower grooved wheels fitting said rod, the sheave-wheel having toothed portions, the spring-held pawl pivoted to said trolley or carriage and designed to engage said toothed portions at one end and projecting at the other end beyond said trolley or carriage so as to be disengaged by said stop or bumper plate, the latch-lever pivotally connected to said trolley or carriage and at its outer end designed to engage said stop or bumper-plate, and the bucket, together with its hoisting-chain, substantially as set forth.

4. The herein-described loading and unloading device, comprising the wagon or platform, the inclined overhanging frame, the guide and clamp bars for the bucket, the single rod secured in said overhanging frame forming a track, the trolley or carriage moving thereon, having a laterally-projecting pin, the hoisting-bucket having a holding-arm, a chain connected to said bucket and passed through said trolley or carriage, and a lever pivoted to one of said guide-bars and designed to be engaged by said laterally-projecting pin so as to disengage said holding-arm, substantially as set forth.

5. The herein-described loading and unloading device, comprising the wagon or platform, the inclined overhanging frame, the guide-bar for the bucket, an outwardly-projecting stop-arm secured thereto, the divergent dumping-bar, the lever secured to said guide-bar, the trolley or carriage moving in said overhanging frame and having a laterally-projecting pin, the hoisting-bucket having a lug or flange, and the holding-arm pivoted at one end designed to engage said lug or flange at its other free end and having a stud or pin designed to be engaged by said lever when the latter is operated by said laterally-projecting pin of the trolley or carriage, substantially as set forth.

6. The herein-described loading and unloading device, comprising the wagon or platform, the overhanging frame, the trolley or carriage, the bucket, the bail pivotally secured thereto, the holding-arm pivoted to said bail at one end and having a guide loop or collar at its other free end encircling one side of said bail and designed to engage said bucket, and means operated by said trolley or carriage for automatically raising the free end of said holding-arm out of engagement with said bucket, substantially as set forth.

7. The herein-described improved loading and unloading device, consisting of the wagon or platform having a pivoted hopper, an inclined overhanging frame secured thereto, the single rod forming a track secured in said frame, the bumper-plate at the lower end of said frame, the trolley or carriage having upper and lower grooved wheels moving on said rod, the sheave-wheel secured in said trolley or carriage, the spring-held pawl engaging said sheave-wheel, the lever-catch designed to engage said bumper-plate, the hoisting-chain passed over said sheave-wheel and having a swivel-hook at its outer end, the operating-shaft having a windlass to which said chain is connected, the hoisting-bucket secured to said swivel-hook and having a lug or flange in its upper end, the pivoted holding-arm engaging such lug or flange, the guide-bar for said bucket, the dump-bar, and the lever secured to said guide-bar for disengaging said holding-arm, substantially as set forth.

In testimony whereof I affix my signature in presence of two witnesses.

RUFUS A. CONVERSE.

Witnesses:
T. R. HUDDLESTON,
P. J. BUTLER.